US012039814B2

(12) United States Patent
Einberg

(10) Patent No.: US 12,039,814 B2
(45) Date of Patent: Jul. 16, 2024

(54) ENABLING REMOTE UNLOCK OF A LOCK

(71) Applicant: ASSA ABLOY AB, Stockholm (SE)

(72) Inventor: Fredrik Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/761,921

(22) PCT Filed: Sep. 25, 2020

(86) PCT No.: PCT/EP2020/076849
§ 371 (c)(1),
(2) Date: Mar. 18, 2022

(87) PCT Pub. No.: WO2021/063811
PCT Pub. Date: Apr. 8, 2021

(65) Prior Publication Data

US 2022/0375288 A1 Nov. 24, 2022

(30) Foreign Application Priority Data

Sep. 30, 2019 (SE) .................................... 1951100-5

(51) Int. Cl.
*G07C 9/22* (2020.01)
*G07C 9/00* (2020.01)

(52) U.S. Cl.
CPC ..... *G07C 9/00571* (2013.01); *G07C 9/00309* (2013.01); *G07C 9/00896* (2013.01); *G07C 9/22* (2020.01)

(58) Field of Classification Search
None
See application file for complete search history.

(56) References Cited

U.S. PATENT DOCUMENTS 6,823,188 B1 * 11/2004 Stern .................... G08G 1/0962
455/414.3
9,367,978 B2 * 6/2016 Sullivan ............. G07C 9/00571
(Continued)

FOREIGN PATENT DOCUMENTS

CN 105404930 3/2016
CN 105427414 3/2016
(Continued)

OTHER PUBLICATIONS

International Search Report and Written Opinion for International (PCT) Patent Application No. PCT/EP2020/076849, dated Jan. 12, 2021, 12 pages.

(Continued)

*Primary Examiner* — K. Wong
(74) *Attorney, Agent, or Firm* — Schwegman Lundberg & Woessner, P.A.

(57) ABSTRACT

It is provided a method for enabling remote unlock of a lock securing access to a physical space. The method is performed in a server and comprises the steps of: receiving, from a first mobile device, an access request to unlock a lock, wherein the request comprises an identifier of the lock and a user identifier associated with an access requester, being a user of the first mobile device; finding a remote credential device being associated with the lock; and transmitting an access request to the remote credential device, the access request comprising an identifier based on the user identifier.

15 Claims, 2 Drawing Sheets

(56) References Cited

U.S. PATENT DOCUMENTS

| | | | | |
|---|---|---|---|---|
| 9,666,000 | B1 * | 5/2017 | Schoenfelder | G07C 9/257 |
| 10,074,130 | B2 * | 9/2018 | Hanson | H04W 4/029 |
| 2012/0280783 | A1 | 11/2012 | Gerhardt et al. | |
| 2013/0104202 | A1 | 4/2013 | Yin et al. | |
| 2014/0266573 | A1 | 9/2014 | Sullivan | |
| 2014/0282929 | A1 | 9/2014 | Tse | |
| 2016/0307380 | A1 | 10/2016 | Ho et al. | |
| 2019/0228601 | A1 * | 7/2019 | Grzenda | E05B 67/22 |
| 2021/0142601 | A1 * | 5/2021 | Schoenfelder | G07C 9/00904 |

FOREIGN PATENT DOCUMENTS

| | | |
|---|---|---|
| CN | 105488887 | 4/2016 |
| CN | 105491133 | 4/2016 |
| CN | 107133680 | 9/2017 |
| CN | 108471517 | 8/2018 |
| CN | 109242424 | 1/2019 |
| CN | 109661794 | 4/2019 |
| CN | 109714374 | 5/2019 |
| EP | 3358534 | 8/2018 |
| WO | WO 2018/104383 | 6/2018 |

OTHER PUBLICATIONS

Second Written Opinion for International (PCT) Patent Application No. PCT/EP2020/076849, dated Aug. 5, 2021, 6 pages.

International Preliminary Report on Patentability for International (PCT) Patent Application No. PCT/EP2020/076849, dated Nov. 25, 2021, 14 pages.

Official Action for Sweden Patent Application No. 1951100-5, dated Oct. 3, 2022, 5 pages.

“CN Application No. 202080065265.3 First Office Action mailed Aug. 30, 2023”, English translation only, 14 pages.

* cited by examiner

ENABLING REMOTE UNLOCK OF A LOCK

CROSS REFERENCE TO RELATED APPLICATIONS

This application is a national stage application under 35 U.S.C. 371 and claims the benefit of PCT Application No. PCT/EP2020/076849 having an international filing date of Sep. 25, 2020, which designated the United States, which PCT application claimed the benefit of Sweden Patent Application No. 1951100-5 filed Sep. 30, 2019, the disclosure of each of which are incorporated herein by reference.

TECHNICAL FIELD

The present disclosure relates to the field of remote unlocking and in particular to a server, method, computer program and computer program product for enabling remote unlock of a lock.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

Some electronic locks allow remote access control. For instance, if a home owner is expecting a plumber to need to enter the home, the home owner can remote control the lock, when needed, to enter an unlocked state, at which point the plumber can enter the home.

For the remote control to function, the lock needs to have a communication path from the device of the home owner. However, online locks are expensive and complicated.

SUMMARY

One objective is to improve the way in which locks can be controlled remotely.

According to a first aspect, it is provided a method for enabling remote unlock of a lock securing access to a physical space. The method is performed in a server and comprises the steps of: receiving, from a first mobile device, an access request to unlock a lock, wherein the request comprises an identifier of the lock and a user identifier associated with an access requester, being a user of the first mobile device; finding a remote credential device being associated with the lock; and transmitting an access request to the remote credential device, the access request comprising an identifier based on the user identifier.

The method may further comprise the steps of: authenticating the user of the first mobile device using a third-party authentication service; and transmitting an indication of authentication to the remote credential device.

The step of transmitting an indication of authentication may form part of the step of transmitting an access request.

The access request to the remote credential device may comprise addressing data, allowing the remote credential device to send lock access data to the first mobile device The method may further comprise the steps of: establishing an end-to-end secure channel between the remote credential device and the lock, such that the server and the first mobile device operate as transparent data relays; and forwarding lock access data from the remote credential device to the lock via the first mobile device over the secure channel.

The method may further comprise the step of: evaluating whether the lock access data is to be forwarded to the first mobile device, and omitting forwarding lock access data when it is evaluated that the lock access data is not to be forwarded to the first mobile device.

The identifier associated with the first mobile device may comprise an image captured by the first mobile device.

The credential device may be a user device for an approval user.

According to a second aspect, it is provided a server for enabling remote unlock of a lock securing access to a physical space. The server comprises: a processor; and a memory storing instructions that, when executed by the processor, cause the server to: receive, from a first mobile device, an access request to unlock a lock, wherein the request comprises an identifier of the lock and a user identifier associated with an access requester, being a user of the first mobile device; find a remote credential device being associated with the lock; and transmit an access request to the remote credential device, the access request comprising identifier based on the user identifier.

The server may further comprise instructions that, when executed by the processor, cause the server to: authenticate the user of the first mobile device using a third-party authentication service; and transmit an indication of authentication to the remote credential device.

The instructions to transmit an indication of authentication may form part of the instructions to transmit an access request.

The access request to the remote credential device may comprise addressing data, allowing the remote credential device to send lock access data to the first mobile device.

The server may further comprise instructions that, when executed by the processor, cause the server to: establish an end-to-end secure channel between the remote credential device and the lock, such that the server and the first mobile device operate as transparent data relays; and forward lock access data from the remote credential device to the lock via the first mobile device over the secure channel.

The server may further comprise instructions that, when executed by the processor, cause the server to: evaluate whether the lock access data is to be forwarded to the first mobile device, and omitting forwarding lock access data when it is evaluated that the lock access data is not to be forwarded to the first mobile device.

The identifier associated with the first mobile device may comprise an image captured by the first mobile device.

The credential device may be a user device for an approval user.

According to a third aspect, it is provided a computer program for enabling remote unlock of a lock securing access to a physical space. The computer program comprises computer program code which, when run on a server causes the server to: receive, from a first mobile device, an access request to unlock a lock, wherein the request comprises an identifier of the lock and a user identifier associated with an access requester, being a user of the first mobile device; find a remote credential device being associated with the lock;

and transmit an access request to the remote credential device, the access request comprising an identifier based on the user identifier.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
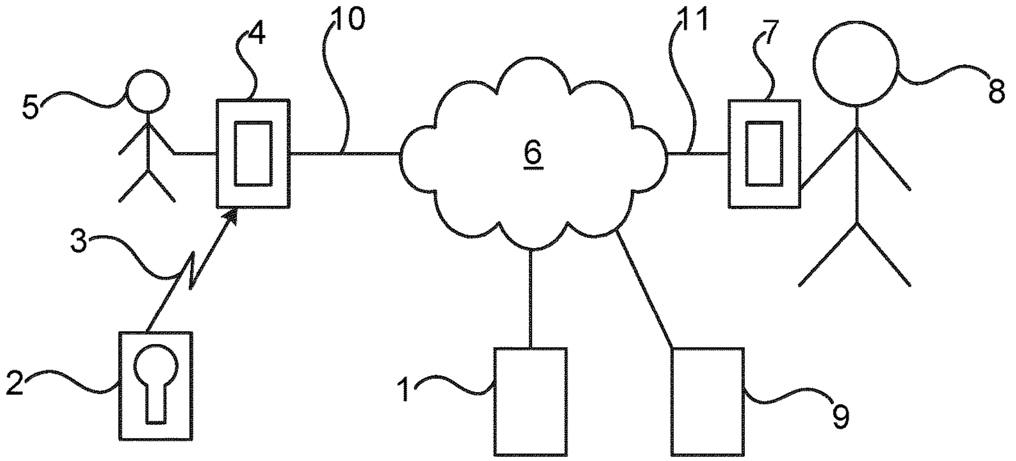
FIG. 1 is a schematic diagram illustrating an environment in which embodiments presented herein can be applied.

FIG. 1 is a schematic diagram illustrating an environment in which embodiments presented herein can be applied. A lock 2 is provided to secure access to a physical space 15. The physical space 15 can e.g. be or be part of a home, office, factory, garden, drawer or any other suitable physical space which can be secured by an electronic lock 2 provided by a door, window, gate, hatch, drawer, etc. The lock 2 is an electronic lock and can be opened using an electronic credential. For instance, the credential can be an electronic key, and may be implemented as part of a mobile phone, a smartphone, a key fob, wearable device, smart phone case, access card, electronic physical key, etc. The electronic key can communicate with the lock 2 over local communication link 3. The local communication link 3 can be any suitable wired or wireless interface, e.g. using Bluetooth, Bluetooth Low Energy (BLE), any of the IEEE 802.15 standards, Radio Frequency Identification (RFID), Near Field Communication (NFC).

In the scenario shown in FIG. 1, the electronic key forms part of a remote credential device 7, carried by an approval user 8. The remote credential device 7 is used for remote access control of the lock 2. The approval user 8 is capable of approving and rejecting requests for remote access to the lock 2. The remote credential device 7 is a portable electronic device, e.g. a smartphone, mobile phone, tablet computer, laptop computer, etc. The remote credential device 7 is connected to a wide area network (WAN) 6 over a WAN link 11. The WAN can e.g. be based on Internet Protocol (IP) and can form part of the Internet.

An access requester 5 is a person who would like access to the physical space 15 secured by the lock 2 but does not carry any such credentials at the time of when access is desired. The access requester 5 can e.g. be a person providing a service, such as a cleaner, plumber, package delivery person, etc. Alternatively, the access requester can be a temporary tenant or guest, such as a person renting the physical space 15 using a service such as Airbnb.

The access requester 5 carries a first mobile device 4 which can communicate with the lock 2 over the local communication link 3. The first mobile device 3 is also connected to the WAN 6 over a WAN link 10.

A server 1 is provided, connected to the WAN 6. The server 1 enables remote control of the lock 2 by the approval user 8 and the remote credential device 7. Also, a third-party authentication server 9 is connected to the WAN 6. The third-party authentication server 9 is optionally used to authenticate the access requester 5 and indicate the identity of the access requester 5 to the server 1 and the remote credential device 7.

Figure 2:
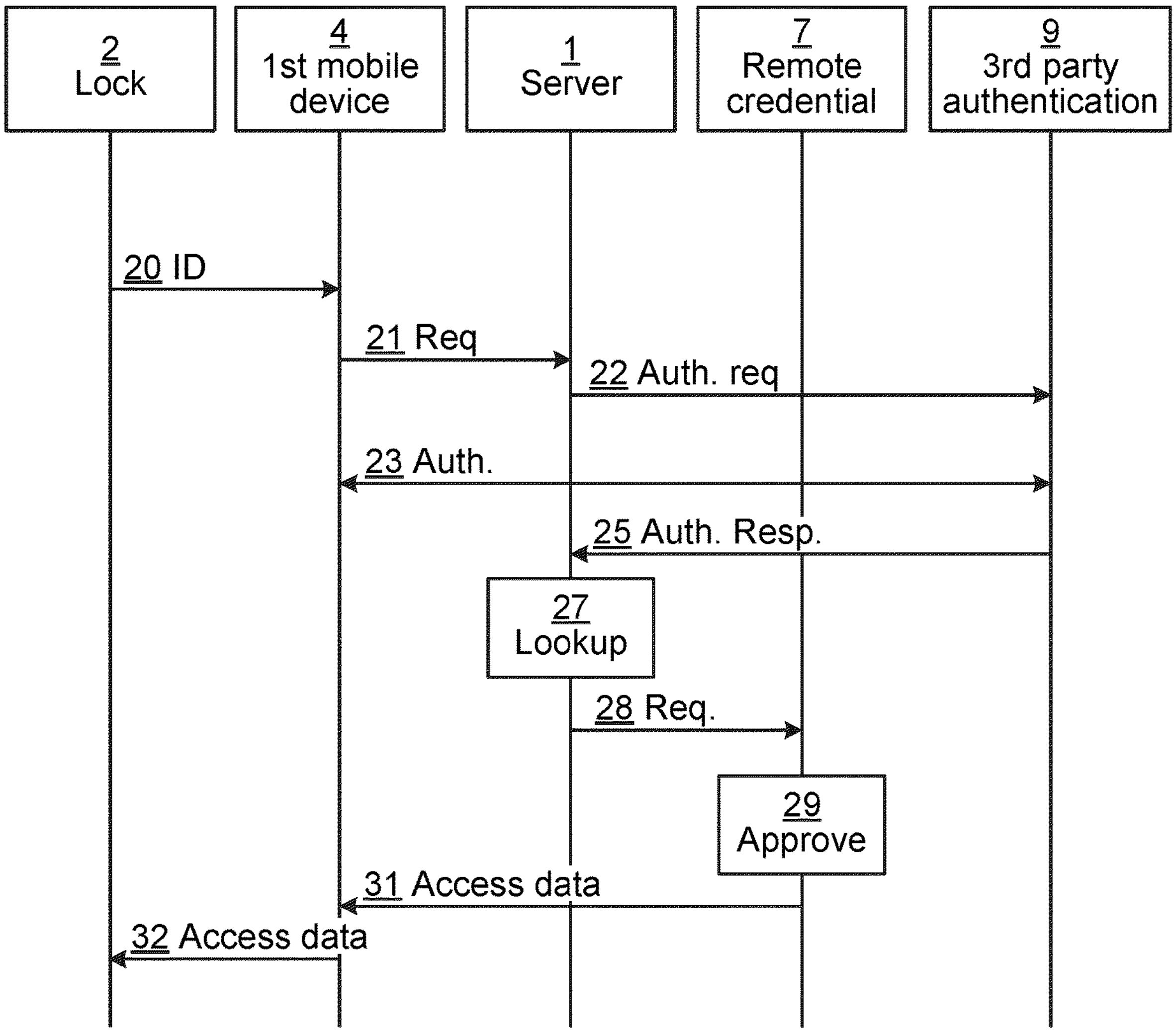
FIG. 2 is a sequence diagrams illustrating communication between various entities of embodiments which can be applied in the environment of FIG. 1.

FIG. 2 is a sequence diagram illustrating communication between various entities of embodiments which can be applied in the environment of FIG. 1.

When the access requester 5 arrives at the site of the lock 2, the access requester uses the first mobile device 4 to obtain an identifier 20 of the electronic lock 2. The identifier 20 can be obtained using local wireless communication e.g. BLE (Bluetooth Low Energy), Bluetooth, NFC (Near-Field Communication), or using an optical code, such as a matrix barcode, e.g. a QR (Quick Response) code.

The first mobile device 4 can now send an access request 21 to the server 1, e.g. by user interface interaction by the access requester 5. The first mobile device 4 can obtain the address to the server 1 from the lock when it receives the identifier of the lock 2, in which case the address of the server 1 does not need to be known beforehand. The address could be in the form of an URI (Uniform Resource Indicator) or an IP address. The access request 21 comprises an identifier of the lock 2 and a user identifier associated with an access requester. The address to the server 1 can be explicitly received in the communication with the lock 2 or the address can be derived from information received in the communication with the lock 2, e.g. using a lookup table or using pre-defined rules for prefix and/or suffix to append.

When the server 1 has received the access request 21 from the first mobile device 1, it optionally sends an authentication request to a third-party authentication server 9, to utilise a third-party authentication service. In this case, the third-party authentication server 9 authenticates 23 first mobile device 4 as known in the art per se and sends an authentication response 25 to the server 1. The authentication response 25 can include the name and/or organisation of the person associated with the first mobile device. Also, an identity number (e.g. social security number or personal identity number) of this person can be included in the authentication response 25. The authentication response 25 can be signed by the third-party authentication server 9, whereby the server 9 can verify the integrity and validity of the authentication response 25. By using the third-party authentication server 9, the server 1 does not need to authenticate the access requester or the first mobile device 4. Hence, no personal data of the access requester then needs to be stored in the server.

The server is now ready to lookup 27 one or more remote credential devices 7 associated with the lock identifier, to allow the server 1 to address the remote credential device(s) 7. This lookup 27 is based on a repository where, based on a lock identifier, the addresses one or more remote credential device(s) can be found. The repository can be stored in an internal or external database. The address to the remote credential device(s) can be in the form of a mobile phone number, IP address or any other identity by which the remote credential device in question can be addressed. Once the lookup 47 is done, the server 1 sends an access request 28 to the remote credential device(s) 7. This access request comprises an identifier based on the user identifier (e.g. from the access request 21 and/or those of authentication response 25, when available) to allow the approval user 8 to evaluate whether to grant access or not for the access requester 5.

If access is denied in the remote credential device (by the approval user 8), the sequence ends. Otherwise, the approval user 8 of one of the remote credential devices 7 approves 29 the access request 28 and generates access data in a form that, when presented to the lock 2, results in the lock 2 unlocking. This access data 31 is transmitted to the first mobile device 4 and the first mobile device 4 presents this access data 32 to the lock, at which point the lock 2 evaluates the access data 32 and, when this is valid, unlocks to allow access to the physical space secured by the lock 2. From the perspective of the lock 2, the access data 32 appears as if its source is a local credential. The access data 31 can be relayed via the server 1 or can be routed from the remote credential 7 to the first mobile device 4 without passing via the server 1. In any case, the access data 31 is optionally transmitted over a secure (e.g. end-to-end encrypted) channel to the lock 2. The access data 31, 32 can be encrypted and/or signed by the remote credential device 7 to achieve end-to-end secure communication between the remote credential device 7 and the lock 2. In this end to end secure communication, the server 1 and the first mobile device 4 only relay the data transmitted between the lock and the remote credential device. Alternatively or additionally, an end-to-end secure channel is established between the remote credential device 7 and the lock 2, over which the access data 31, 32 is communicated. The access data 31, 32 can be a data object with access rights or a command to unlock the lock 2. The lock verifies the access data 32 (e.g. verifying signature, decrypting data, checking authorisation) and performs an unlocking action if the verification is successful.

Figure 3:
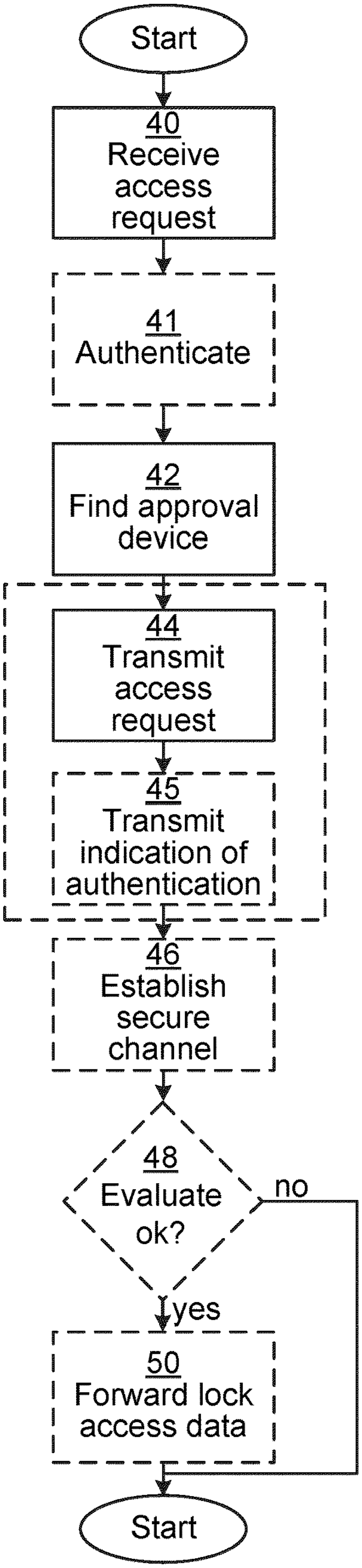
FIG. 3 is a flow chart illustrating embodiments of methods for enabling remote unlock of a lock.

FIG. 3 is a flow chart illustrating embodiments of methods for enabling remote unlock of a lock securing access to a physical space, performed in the server 1. The method essentially corresponds to actions performed by the server 1 in the sequence diagram of FIG. 2, described above.

In a receive access request step 40, the server receives, from a first mobile device, an access request to unlock a lock. The request comprises an identifier of the lock and user identifier associated with an access requester. As explained above, the access requester is the user of the first mobile device. The user identifier can be any data associated with the access requester, e.g. phone number, an image of the access requester, personal identity number (e.g. social security number), etc. The user identifier can be communicated in a subsequent access request.

In an optional authenticate step 41, the server authenticating the user of the first mobile device using a third-party authentication service as described in more detail above.

In a find remote credential device step 42, the server finds, based on the identifier of the lock, a remote credential device being associated with the lock. The credential device may be a user device (e.g. smartphone or other portable device) for an approval user.

In a transmit access request step 44, the server transmits an access request to the remote credential device. The access request comprises an identifier based on the user identifier of the access request received in step 40. In the simplest case, the identifier is the user identifier. The access request to the remote credential device can comprise addressing data, allowing the remote credential device to send lock access data to the first mobile device, without requiring routing the lock access data via the server. The addressing can e.g. be in the form of a public IP address. The public IP address can then be used by the remote credential device to connect direct to the first mobile device.

In an optional transmit indication of authentication step 45, the server transmits an indication of authentication to the remote credential device, when this is available as a result of the authenticate step 41. The indication of authentication can comprise any one or more of name, organisation, and personal identity number, of the user of the first mobile device.

The access request to the remote credential device and the indication of authentication can be transmitted separately or simultaneously, e.g. as part of the same data item. For instance, the transmit access request step 44 and the transmit indication of authentication step 45 can form part of the same step.

In an optional establish secure channel step 46, the server establishing an end-to-end secure channel between the remote credential device and the lock, such that the server and the first mobile device operate as transparent data relays.

In an optional conditional evaluate ok step 48, the server evaluates whether the lock access data is to be forwarded to the first mobile device. If the lock access data is to be forwarded to the first mobile device, the method proceeds to an optional transmit lock access data step 49. Otherwise, the method ends.

In the optional forward lock access data step 50, the server forwards lock access data from the remote credential device to the lock via the first mobile device over the secure channel. When step 48 is performed, the forwarding is only performed when the evaluation is affirmative.

When steps 46, 50 (and optionally 48) are performed, the communication between the remote credential device and the lock pass via the server. This enables a secure end-to-end channel between the two end devices of the lock and the remote credential device. Moreover, when step 48 is performed, the server can block communication, and thus remote access, if needed. For instance, this allows an approval user to block any communication from her/his remote credential device if it gets lost or stolen.

Using the embodiments presented herein, no credential needs to be stored in the server; it is sufficient that credentials are stored in the remote credential device. In a system with many remote credential devices, this reduces the risk of the credentials being hacked, compared to a solution where the credentials are stored in the server. Moreover, the lock does not need to be fully online; it is sufficient that the first mobile device acts as a gateway between the lock and the remote credential device. Furthermore, from the perspective of the lock, it simply receives the access data from the first mobile device as if the access data was received from a locally present credential. This simplifies implementation of the embodiments presented herein since there is no modification needed for the lock.

Figure 4:
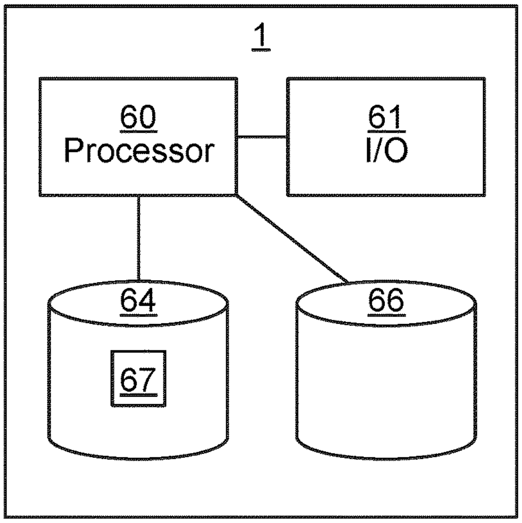
FIG. 4 is a schematic diagram illustrating components of the server of FIG. 1 according to one embodiment.

FIG. 4 is a schematic diagram illustrating components of the server 1 of FIG. 1 according to one embodiment. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The server 1 further comprises an I/O interface 62 for communicating with external and/or internal entities. Optionally, the I/O interface 62 also includes a user interface.

Other components of the server 1 are omitted in order not to obscure the concepts presented herein.

Figure 5:
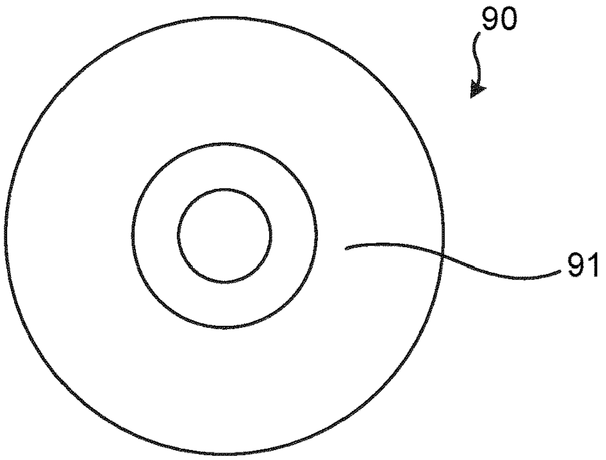
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for enabling remote unlock of a lock securing access to a physical space, the method being performed in a server and comprising:

receiving, from a first mobile device, a first access request to unlock a lock, wherein the first access request comprises an identifier of the lock and a user identifier associated with an access requester, being a user of the first mobile device;

finding, based on the identifier of the lock, a remote credential device being associated with the lock;

transmitting a second access request to the remote credential device, the second access request comprising an identifier based on the user identifier;

establishing an end-to-end secure channel between the remote credential device and the lock with the server and the first mobile device as intermediate devices operating as transparent data relays; and forwarding lock access data from the remote credential device to the lock via the first mobile device over the secure channel.

2. The method according to claim 1, further comprising:

authenticating the user of the first mobile device using a third-party authentication service; and transmitting an indication of authentication to the remote credential device.

3. The method according to claim 2, wherein transmitting an indication of authentication forms part of transmitting the second access request.

4. The method according to claim 1, wherein the second access request comprises addressing data, allowing the remote credential device to send lock access data to the first mobile device.

5. The method according to claim 1, further comprising:

evaluating whether the lock access data is to be forwarded to the first mobile device, and omitting forwarding lock access data when it is evaluated that the lock access data is not to be forwarded to the first mobile device.

6. The method according to claim 1, wherein the identifier associated with the first mobile device comprises an image captured by the first mobile device.

7. The method according to claim 1, wherein the remote credential device is a user device for an approval user.

8. A server for enabling remote unlock of a lock securing access to a physical space, the server comprising:

a processor; and a memory storing instructions that, when executed by the processor, cause the server to:

receive, from a first mobile device, a first access request to unlock a lock, wherein the first access request comprises an identifier of the lock and a user identifier associated with an access requester, being a user of the first mobile device;

find, based on the identifier of the lock, a remote credential device being associated with the lock;

transmit a second access request to the remote credential device, the second access request comprising identifier based on the user identifier;

establish an end-to-end secure channel between the remote credential device and the lock, with the server and the first mobile device as intermediate devices operating as transparent data relays; and forward lock access data from the remote credential device to the lock via the first mobile device over the secure channel.

9. The server according to claim 8, further comprising instructions that, when executed by the processor, cause the server to:

authenticate the user of the first mobile device using a third-party authentication service; and transmit an indication of authentication to the remote credential device.

10. The server according to claim 9, wherein the instructions to transmit an indication of authentication forms part of the instructions to transmit the second access request.

11. The server according to claim 8, wherein the second access request comprises addressing data, allowing the remote credential device to send lock access data to the first mobile device.

12. The server according to claim 8, further comprising instructions that, when executed by the processor, cause the server to:

evaluate whether the lock access data is to be forwarded to the first mobile device, and omitting forwarding lock access data when it is evaluated that the lock access data is not to be forwarded to the first mobile device.

13. The server according to claim 8, wherein the identifier associated with the first mobile device comprises an image captured by the first mobile device.

14. The server according to claim 8, wherein the remote credential device is a user device for an approval user.

15. A non-transitory computer readable medium storing a computer program for enabling remote unlock of a lock securing access to a physical space, the computer program comprising computer program code which, when run on a server causes the server to:

receive, from a first mobile device, a first access request to unlock a lock, wherein the first access request comprises an identifier of the lock and a user identifier associated with an access requester, being a user of the first mobile device;

find, based on the identifier of the lock, a remote credential device being associated with the lock;

transmit a second access request to the remote credential device, the second access request comprising an identifier based on the user identifier;

establish an end-to-end secure channel between the remote credential device and the lock with the server and the first mobile device as intermediate devices operating as transparent data relays; and forward lock access data from the remote credential device to the lock via the first mobile device over the secure channel.

* * * * *